United States Patent Office 2,897,158
Patented July 28, 1959

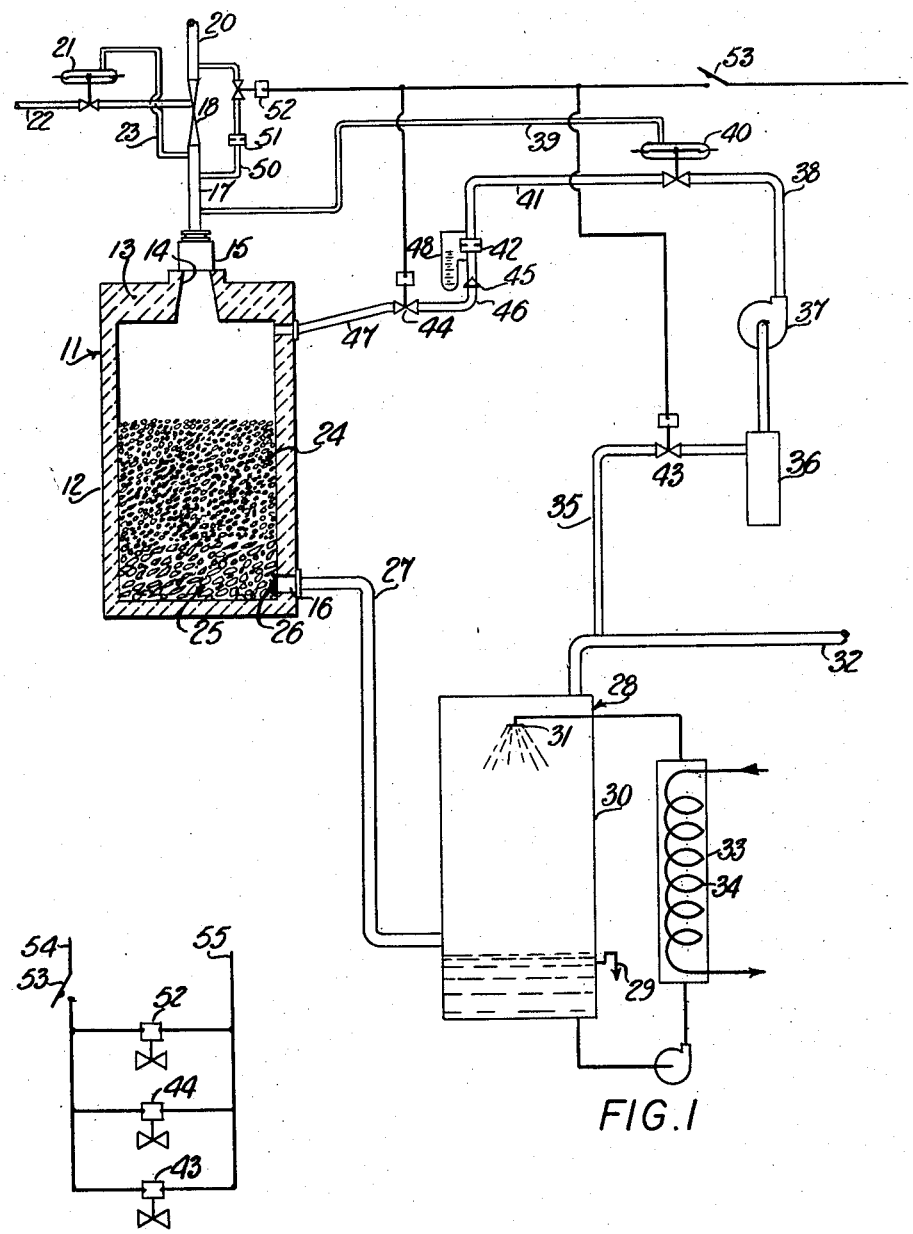

2,897,158

GAS GENERATOR

Charles W. Sanzenbacher, Toledo, and Jack Huebler, Sylvania, Ohio, assignors to Surface Combustion Corporation, Toledo, Ohio, a corporation of Ohio Application September 19, 1955, Serial No. 535,022

7 Claims. (Cl. 252—372)

This invention pertains to a method of and apparatus for generating gas and more specifically to a generator having recirculation means for controlling combustion temperatures to a safe operating range.

Atmosphere furnaces and gas generators therefor for heat treating operations such as carburizing, bright annealing, and carbon restoration are well-known in the art today and are common in industries employing heat treating operations. This invention is an improvement for those generators producing atmosphere gas by an exothermic reaction between hydrocarbon fuel and air.

Exothermic generators are often designed to generate gases of varying composition for various types of operations. An example of this is a generator that is supplied a combustible air-gas mixture which can, merely by varying the air-gas ratio, generate a relatively lean or relatively rich gas. The following lean and rich compositions, shown in percentages of gas at the same final dew point, were obtained from mixtures of natural gas fuel and air:

|      | $O_2$ | $CO_2$ | $CO$ | $H_2$ | $CH_4$ | $H_2O$ | $N_2$ |
|------|-------|--------|------|-------|--------|--------|-------|
| Lean | 0     | 10.5   | 1.5  | 1.2   | .0     | 0.8    | 86.0  |
| Rich | 0     | 5.0    | 10.5 | 12.5  | .5     | 0.8    | 70.7  |

By burning the mixture in the presence of a catalyst and at a lower air-gas ratio, a gas may be generated having less carbon dioxide and methane and more carbon monoxide and hydrogen, the hydrogen content reaching 17% or more. Such a gas is effective in bright annealing steel.

In many cases, as the above, the heat treating furnaces are periodically purged with a lean gas as the furnace is being cooled and heated before and after week-end shut downs. This also burns out carbon deposits that are formed throughout the furnaces during periods of normal operation when a rich atmosphere gas is used. Such deposits can cause inefficient heating if allowed to build up. The generator is thus required to produce a rich gas during normal operations and a lean gas during purging. The latter may take place for periods of twelve hours or more.

In producing rich gas, air-gas ratios of approximately five or six to one are used and for lean gas a ratio of approximately nine to one is necessary. These ratios are in reference to natural gas whose stoichiometric air-gas ratio is approximately ten to one. During generation of lean gas more complete combustion of the air-gas mixture occurs than during generation of rich gas since the air-gas ratio is closer to stoichiometric proportions. The more complete combustion results in a higher heat release, and causes the generator to be subjected to higher temperatures during periods in which lean gas is being generated.

Higher generator costs, due to the use of more expensive materials necessary to effectively withstand these higher temperatures, may result in such cases, or the life of the generator may be correspondingly decreased if more temperature resistant materials are not used. Higher temperatures are frequently harmful to catalysts contained therein which may be destroyed by such excessive heat. In the previous example, for instance, a nickel impregnated alumina catalyst is used. The life of such catalyst is sharply shortened and its efficiency sharply reduced if its temperature exceeds 2150–2200° F. Generation of lean gas can produce temperatures above this limit.

A water-cooled jacket may be placed around the combustion chamber or an equivalent built-in heat loss may be incorporated to maintain its temperature lower. Although this is effective, it also serves to decrease the temperature during periods of rich gas generation. Such reduction in temperature during those times tends to produce a higher methane content in the generated gas, which, in turn, increases carbon deposition in the furnace. Reduced temperatures will also reduce the generator capacity, and if carried to extreme will stop the reaction.

To overcome this problem a portion of the generated gas is recirculated during periods of lean operation to maintain a lower temperature during such periods and not affect the temperature during periods of rich operation.

For further consideration of what we believe to be novel and our invention, refer to the drawing, the specification, and claims pertaining thereto.

In the drawing:

Figure 1 illustrates a preferred form of apparatus embodying the invention, and

Figure 2 shows an electrical diagram of control apparatus for the apparatus of Fig. 1.

The generator 11 comprises a casing 12, refractory 13 forming a burner tunnel 14, a burner 15, and an outlet 16. A pre-mixture of gas and air is supplied to burner 16 through a mixture pipe 17 and a venturi mixer 18. Air is supplied to the venturi mixer inlet by a blower or similar means (not shown) through pipe 20. Gas is delivered to the throat of venturi mixer 18 from a gas source (not shown) through regulator 21 and pipe 22. Regulator 21 is backloaded through line 23 to the mixture pipe 17. This maintains the gas pressure proportional to the mixture pressure and assures constant proportioning of the air-gas mixture.

The mixture is ignited in burner 15 by any suitable means such as a gas pilot or spark plug. This burning mixture then passes through catalyst 24 and a filler 25 which maintains the catalyst away from the cooler parts of the chamber where a reversible action may occur. Screen 26 keeps the above mentioned material from spilling into outlet pipe 27.

The gas from outlet 16 is fed to a recirculating condensate cooler 28 of the type shown in Patent Number 2,714,552. It comprises a direct cooler 30 which has a spray 31 spraying condensate water in contact with the gas passing upward to manifold line 32 and thence to a furnace or furnaces. The condensate water is collected in the bottom of direct cooler 30 and passed through indirect cooler 33 where it is cooled by coils 34 containing a coolant and then circulated to spray 31 again. A trap 29 is provided in cooler 30 to maintain a constant level of the water therein. This level tends to rise due to condensate constantly being added from moisture in the generated gas, thus causing a substantially constant overflow through trap 29.

A branch pipe 35 carries a portion of the gas from manifold line 32 through an inlet valve 43 and to sediment trap 36 and blower 37. The latter is sized to carry the maximum volume of recirculated gas that may be required and at a pressure equal to, or greater than, the mixture pressure in pipe 17. The gas is then passed through pipe 38 and regulator 40 which is back loaded through line 39 to pipe 17 in order to maintain a pressure in pipe 41 equal to the pressure of the pre-mixture. The pressure drop in this recirculating system from a point downstream of regulator 40 to the combustion chamber will then equal that from the outlet of venturi 18 to the chamber. This automatically varies the amount of recirculating gas according to variations in the pre-mixture flow and maintains a constant ratio between the two for a given air-gas ratio. If the latter ratio is changed, the former ratio may be changed by substituting a different size orifice for orifice 42 or varying outlet valve 44. From regulator 40 the gas is passed through orifice 42, check valve 45 in pipe 46, outlet valve 44, and pipe 47 to the generator. Check valve 45 prevents gas from backing up in the recirculating system when no recirculation is occurring. Pipe 47 is sloped slightly toward the generator to allow any condensate to drain to the chamber. A U-tube 48 may be employed across orifice 42 to measure the amount of gas recirculating.

If the generator is employed in only two positions— an operating or rich position and purging or lean position—an automatic control may be employed. In this case, a by-pass line 50 is inserted around venturi 18 and contains an orifice 51 which is sized to allow sufficient additional air to the mixture to create the desired lean ratio. Valve 52 is provided in line 50 to provide on-off control of air passing therethrough. Valves 43, 44, and 52 are then relay or motor operated by current controlled by a single switch 53. If a change from rich to lean operation is desired, switch 53 is closed, thus supplying current to the three valves and opening them. This provides both a lean ratio and recirculation with one switch. The circuit is diagrammatically shown in Figure 2 with current supplied by wires 54 and 55.

For many furnace operations, a large variety of air-gas ratios may be employed for a variety of heat treating operations. In such a case, a motor-operated valve may be substituted for orifice 42. This valve would be operated by a standard temperature control instrument responsive to a thermocouple placed in the generator. The valve would then be automatically opened a sufficient amount to prevent the generator temperature from rising above a pre-determined point. Alternatively, motorized valves may be substituted for orifice 51 and orifice 42 to operate proportionately so that as the first valve opens to produce a leaner gas, the second opens to dilute the gas in the generator and prevent overheating.

Other variations may be employed without departing from the scope of the invention whose limits are defined in the appended claims.

We claim:

1. In a gas generator containing a catalyst a method of operation, under conditions which will not overheat said catalyst, which includes the steps of forming a substantially stoichiometric air-fuel mixture, igniting said mixture, substantially completing combustion of the ignited mixture, in a combustion chamber to form combustion products passing the products through a catalyst, cooling the products, continuously recirculating a portion of the products to the combustion chamber and blending them with the initially generated products after substantial combustion of said air-fuel mixture but before passing said products through the catalyst, whereby complete combustion of the air-fuel mixture is obtained while maintaining the temperatures of the catalyst below 2200° F.

2. In a gas generator comprising in combination: wall means forming a chamber; a burner at one end of said chamber; a mixer; means for supplying air to said mixer; means for supplying fuel to said mixer; pipe means leading from the outlet of said mixer to said burner for conveying an air-fuel mixture to said burner for substantial combustion thereof in said chamber at a point adjacent said burner to form hot products of combustion; catalyst disposed within said chamber spaced from said burner a sufficient distance to constitute a mixing zone between the point of substantial combustion of said air-fuel mixture and said catalyst; a cooler; an outlet duct connecting said chamber to said cooler for delivery of a gaseous mixture from said chamber to said cooler for cooling of the gaseous mixture; a delivery duct connected to said cooler for delivery of the cooled gaseous mixture; conduit means for carrying a portion of the cooled gaseous mixture in said delivery duct to said mixing zone within said chamber and mixing the cooled gaseous mixture with the hot products of combustion before passage through said catalyst to said outlet duct; and a pressure regulating valve in said conduit means responsive to pressure in said pipe means to maintain the pressure in said conduit equal to the pressure of the air-fuel mixture in said pipe means thereby providing automatic control for varying the amount of cooled gaseous mixture admitted to said chamber according to variations in the air-fuel mixture flow.

3. Apparatus for changing the air-fuel ratio and recirculation in apparatus according to claim 2 comprising: second pipe means connecting the air supply means to said pipe means; an orifice in said second pipe means; a first flow control valve in said second pipe means; a second flow control valve in said conduit; and means for simultaneously actuating said first and second flow control valves.

4. In a gas generator comprising in combination: wall means forming a chamber; a burner at one end of said chamber; means for introducing an air-fuel mixture to said burner for substantial combustion of said air-fuel mixture at a point adjacent said burner to form hot products of combustion; catalyst disposed within said chamber spaced from said burner a sufficient distance to constitute a mixing zone between the point of substantial combustion and said catalyst; a cooler; an outlet duct for the delivery of a gaseous mixture from said chamber to said cooler for cooling of the gaseous mixture; a delivery duct connected to said cooler for delivery of the cooled gaseous mixture; conduit means for carrying a portion of the cooled gaseous mixture in said delivery duct to said mixing zone within said chamber and mixing said cooled gaseous mixture with the hot products of combustion before passage through said catalyst to said outlet duct; a valve in said conduit means; a thermometer in said chamber; and a temperature control instrument operatively connected to said thermometer and said valve to automatically control said valve and consequently the flow in said conduit means in response to the temperature in said chamber.

5. In a gas generator comprising in combination: wall means forming a chamber; a burner at one end of said chamber; a mixer; means for supplying air to said mixer; means for supplying fuel to said mixer; first pipe means leading from the outlet of said mixer to said burner for conveying an air-fuel mixture to said burner for substantial combustion thereof in said chamber at a point adjacent said burner to form hot products of combustion; second pipe means connecting the air supply means to said first pipe means; a first flow control valve in said second pipe means for varying the amount of air supplied to said first pipe means and hence the air-fuel ratio of the mixture supplied to said burner; catalyst disposed within said chamber spaced from said burner a sufficient distance to constitute a mixing zone between the point of substantial combustion of said air-fuel mixture and said catalyst; a cooler; an outlet duct connecting said chamber to said cooler for delivery of a gaseous mixture from said chamber to said cooler for cooling of the gaseous mixture; a delivery duct connected to said cooler for delivery of the cooled gaseous mixture; conduit means for carrying a portion of the cooled gaseous mixture in said delivery duct to said mixing zone within said chamber and mixing the cooled gaseous mixture with the hot products of combustion before passage through said catalyst to said outlet duct; a second flow control valve in said conduit for varying the flow of the cooled gaseous mixture admitted to said chamber; means for operatively connecting said first and second flow control valves to function proportionately so that as the first valve is opened to produce a leaner air-fuel mixture, the second valve opens to dilute the products of combustion in said chamber to prevent overheating.

6. In a gas generator comprising in combination: wall means forming a chamber; a burner tunnel at one end of said chamber; a burner attached to said burner tunnel; means for introducing an air-fuel mixture to said burner for substantial combustion of the air-fuel mixture within said tunnel to form hot products of combustion; catalyst disposed within said chamber spaced from said tunnel a sufficient distance to constitute a mixing zone between said tunnel and said catalyst; a cooler; an outlet duct for the delivery of a gaseous mixture from said chamber to said cooler for cooling of the gaseous mixture; a delivery duct connected to said cooler for delivery of the cooled gaseous mixture; and conduit means for carrying a portion of the cooled gaseous mixture in said delivery duct to said mixing zone within said chamber and mixing said cooled gaseous mixture with the hot products of combustion from said tunnel before passage through said catalyst to said outlet duct.

7. In a gas generator comprising in combination: wall means forming a chamber; a burner at one end of said chamber; means for introducing an air-fuel mixture to said burner; means for igniting and substantially completing combustion of said air-fuel mixture at a point adjacent said burner to form hot products of combustion; catalyst disposed within said chamber spaced from said burner a sufficient distance to constitute a mixing zone between the point of ignition and substantial completion of combustion and said catalyst; a cooler; an outlet duct for the delivery of a gaseous mixture from said chamber to said cooler for cooling of the gaseous mixture; a delivery duct connected to said cooler for delivery of the cooled gaseous mixture; conduit means for carrying a portion of the cooled gaseous mixture in said delivery duct to said mixing zone within said chamber and mixing said cooled gaseous mixture with the hot products of combustion before passage through said catalyst to said outlet duct.

References Cited in the file of this patent

UNITED STATES PATENTS

| | | |
|---|---|---|
| 2,051,125 | Bacon | Aug. 18, 1936 |
| 2,085,584 | Haskell | June 29, 1937 |
| 2,615,795 | Peck et al. | Oct. 28, 1952 |
| 2,729,546 | Williamson | Jan. 3, 1956 |